(12) United States Patent
Dusik et al.

(10) Patent No.: US 9,506,398 B2
(45) Date of Patent: Nov. 29, 2016

(54) WASTEGATE VALVE DEVICE

(71) Applicant: Mahle International GmbH, Stuttgart (DE)

(72) Inventors: Marius Dusik, Reichenbach (DE); Werner Schadler, Seggauberg (AT); Peter Wieske, Korntal-Muenchingen (DE)

(73) Assignee: Mahle International GmbH (DE)

( * ) Notice: Subject to any disclaimer, the term of this patent is extended or adjusted under 35 U.S.C. 154(b) by 127 days.

(21) Appl. No.: 14/386,812

(22) PCT Filed: Mar. 19, 2013

(86) PCT No.: PCT/EP2013/055634
§ 371 (c)(1),
(2) Date: Sep. 21, 2014

(87) PCT Pub. No.: WO2013/139762
PCT Pub. Date: Sep. 26, 2013

(65) Prior Publication Data
US 2015/0033733 A1 Feb. 5, 2015

(30) Foreign Application Priority Data
Mar. 21, 2012 (DE) .......................... 10 2012 204 497

(51) Int. Cl.
*F02B 37/18* (2006.01)
(52) U.S. Cl.
CPC ............ *F02B 37/186* (2013.01); *F02B 37/18* (2013.01); *F02B 37/183* (2013.01); *Y02T 10/144* (2013.01)
(58) Field of Classification Search
CPC .... F02B 37/186; F02B 37/183; F02B 37/18; Y02T 10/144

USPC .......................................................... 60/602
See application file for complete search history.

(56) References Cited

U.S. PATENT DOCUMENTS 3,315,537 A * 4/1967 Keller ................. F16H 59/0208
74/473.29
6,148,689 A * 11/2000 Uneme ................... F16C 1/108
74/502.1

(Continued)

FOREIGN PATENT DOCUMENTS

DE 102007018618 A1 10/2007
DE 102009051623 A1 5/2011

(Continued)

OTHER PUBLICATIONS

English Translation to DE 10 2007 018618 Al, published Oct. 25, 2007.*

(Continued)

*Primary Examiner* — Thai Ba Trieu
(74) *Attorney, Agent, or Firm* — Fishman Stewart PLLC

(57) ABSTRACT

A wastegate valve device for a supercharging device may include a valve disc, which is connected to an actuator device via a drive train. The wastegate valve device may include at least one damping element arranged between the valve disc and the actuator device. The drive train may have an inner section, which is arranged inside a fluid path of a driving fluid. The inner section may include a spindle arm, which is connected to a spindle and to the valve disc. The spindle may be connected to an operating arm, which is arranged in an outer section of the drive train. The operating arm may be arranged outside the fluid path, and may be connected to an operating rod, which is connected to the actuator device. The damping element may be arranged in a connection region of the drive train.

20 Claims, 3 Drawing Sheets

(56) References Cited

U.S. PATENT DOCUMENTS

| | | | |
|---|---|---|---|
| 7,644,583 B2* | 1/2010 | Leavesley | F02B 37/18 60/602 |
| 8,474,257 B2* | 7/2013 | Yoshimoto | F02B 37/183 60/602 |
| 8,578,712 B2* | 11/2013 | Natali | F02B 37/186 60/602 |
| 8,701,408 B2 | 4/2014 | Dettmann et al. | |
| 8,869,527 B2* | 10/2014 | Werstat | F02B 37/186 60/602 |
| 9,109,713 B2* | 8/2015 | Weber | F02B 37/186 251/231 |
| 2009/0092481 A1* | 4/2009 | Genin | F01D 17/20 415/145 |
| 2012/0055154 A1 | 3/2012 | Ebert | |
| 2012/0117966 A1* | 5/2012 | Boening | F02B 37/186 60/615 |
| 2012/0304951 A1* | 12/2012 | Weber | F02B 37/186 251/231 |
| 2012/0317975 A1* | 12/2012 | Schoenherr | F02B 37/183 60/602 |
| 2013/0255250 A1 | 10/2013 | Naunheim et al. | |
| 2013/0305712 A1* | 11/2013 | Langohr | F02B 37/186 60/602 |
| 2013/0333379 A1 | 12/2013 | Hinkelmann et al. | |
| 2014/0140831 A1* | 5/2014 | Tschirschke | F02B 37/186 415/182.1 |
| 2014/0169946 A1* | 6/2014 | Stilgenbauer | F02B 37/183 415/144 |
| 2015/0097345 A1* | 4/2015 | House | F02B 37/186 277/585 |
| 2015/0147162 A1* | 5/2015 | Stilgenbauer | F02B 37/186 415/145 |
| 2015/0226110 A1* | 8/2015 | Wang | F02B 37/186 60/600 |
| 2015/0233381 A1* | 8/2015 | Christmann | F04D 27/009 415/145 |
| 2015/0247448 A1* | 9/2015 | Micanek | F02B 37/186 417/405 |
| 2015/0267605 A1* | 9/2015 | Lombard | F02B 37/183 60/602 |

FOREIGN PATENT DOCUMENTS

| | | | | |
|---|---|---|---|---|
| DE | 102009053829 | * | 5/2011 | ............ F02B 37/186 |
| DE | 102009057161 A1 | | 6/2011 | |
| DE | 102010004559 A1 | | 7/2011 | |
| DE | 202011101119 U1 | | 7/2011 | |
| DE | 102010043147 A1 | | 10/2011 | |
| DE | 102010026799 A1 | | 1/2012 | |
| DE | 102010040583 A1 | | 3/2012 | |
| DE | 102010049466 A1 | | 4/2012 | |
| DE | 102010055382 A1 | | 6/2012 | |
| DE | 112010002024 T5 | | 8/2012 | |
| DE | 102011075201 A1 | | 11/2012 | |
| DE | 102011076361 A1 | | 11/2012 | |
| DE | 102011079600 A1 | | 1/2013 | |
| EP | 0972918 A2 | | 1/2000 | |
| EP | 1256703 A2 | | 11/2002 | |
| EP | 2172632 A1 | | 4/2010 | |
| EP | 2317095 A1 | | 5/2011 | |
| JP | 2003148155 A | * | 5/2003 | |
| JP | 2005-315179 A | | 11/2005 | |
| JP | 2013002296 A | * | 1/2013 | ............. F02B 37/18 |
| KR | 100639513 B1 | * | 10/2006 | ............. F02B 37/18 |

OTHER PUBLICATIONS

A Machine translation to DE 10 2009 057161 A1, published on Jun. 9, 2011.*
A Machine translation to DE 20 2011 101119 U1, published on Jul. 19, 2011.*
English abstract for DE-102007018618.
English abstract for DE-102009051623.
English abstract for DE-102009057161.
English abstract for DE-102010026799.
English abstract for DE-102010043147.
English abstract for DE-102010055382.
English abstract for DE-102011075201.
English abstract for DE-102011076361.
English abstract for DE-102011079600.
English abstract for DE-202011101119.
English abstract for EP-2317095.
English abstract for JP-2005-315179.

* cited by examiner

WASTEGATE VALVE DEVICE

CROSS-REFERENCE TO RELATED APPLICATIONS

This application claims priority to International Patent Application PCT/EP2013/055634 filed Mar. 19, 2013 and German Patent Application No. 10 2012 204 497.3 filed Mar. 21, 2012, the contents of which are hereby incorporated by reference in their entirety.

TECHNICAL FIELD

The present invention relates to a wastegate valve device for a supercharging device, in particular for an exhaust gas turbocharger, having a valve disc that is connected via a drive train to an actuator device.

BACKGROUND

Wastegate valve devices for supercharging devices, in particular for exhaust gas turbochargers, have been known from the prior art for a long time. They are used to regulate the power of the associated supercharging device and are usually arranged on a turbine side of the supercharging device to open and close a bypass that bypasses a turbine or turbine wheel of the supercharging device. Such a wastegate valve device usually has a valve disc that is connected by means of a drive train to an actuator device, which can move the disc between an open position and a closed position. In this case the constituents of the wastegate valve device have a play relative to each other for production and assembly reasons. When the wastegate valve device is in the closed position, the valve disc sits on an associated valve seat, which is usually formed or arranged in a turbine housing of the supercharging device. When the wastegate valve device is in the open position, the valve disc lifts from the valve seat, so vibrations caused by operation, in particular of the valve disc, can occur, which can result in damage to the wastegate valve device, in particular to the drive train, and also in undesirable noise. Such vibrations occur in particular if the valve disc is opened during partial loading of an associated machine, in particular internal combustion engine, which is possible for example by means of electrically operated actuator devices.

SUMMARY

The present invention is concerned with the problem of specifying an improved or at least alternative embodiment for a wastegate valve device for a supercharging device, in particular for an exhaust gas turbocharger, of the generic type, which in particular involves reduced vibrations and/or reduced noise and/or reduced wear.

This problem is solved according to the invention by the subject matter of the independent claim. Advantageous embodiments form the subject matter of the dependent claims.

The present invention is based on the general concept of damping the vibrations that occur in particular when the valve disc of a wastegate valve device is in the open position with the aid of at least one damping element and thus preventing or at least reducing wear of the wastegate valve device caused by such vibrations and also preventing or at least reducing noise occurring because of said vibrations. The damping element therefore serves the purpose of damping the vibrations occurring between the valve disc and the actuator device for actuating the valve disc. In this case the damping element is preferably integrated in the drive train via which the actuator device actuates the valve disc.

The inventive concept in principle gives rise to two possibilities for designing and arranging such a damping element. In the first possibility, the damping element is arranged as a separate component between the valve disc and the actuator device, preferably in the drive train. In the second possibility, the damping element is formed as an integral constituent of the drive train, for example by corresponding deformation of the drive train.

In this sense, damping elements mean both separate constituents or components and integral constituents of the drive train. Such a damping element is in this case preferably arranged at a point in the drive train at which a force-fitting or form-fitting connection between two separate components is realised.

The valve disc of the wastegate valve device is preferably connected to a spindle arm of a spindle, which is mounted in a housing of the associated supercharging device, for example by means of a bushing. The spindle and the spindle arm can be formed in one piece. The spindle is connected on the side outside the housing in a rotationally fixed manner to an actuating arm, which is connected on the other side to an actuating rod. The actuating rod is additionally connected to the actuator device, the at least one damping element preferably being arranged at or in one of said connection points. The drive train therefore has the actuating rod and the actuating arm in an outer section and the spindle arm in an inner section, the two sections of the drive train being connected to each other by means of the spindle. In this case the inner section lies inside a fluid path of a driven fluid, in particular an exhaust gas of an associated internal combustion engine, while the outer section lies outside said fluid path.

The at least one damping element is preferably arranged in the outer section of the drive train. The inner section is exposed to more aggressive thermodynamic conditions, in particular higher temperatures, than the outer section, so lower loading of the damping element is achieved by arranging the at least one damping element in the outer section. It is then also possible in particular to use cheaper materials, for example plastic and the like and/or to extend the service life of the wastegate valve device.

The actuating rod can have a coupling member, which is connected to the actuating arm. The actuating rod can thereby be formed in two parts, it being possible for the connection of the coupling member to the rest of the actuating rod to be realised by the coupling member having a recess in which a coupling section of the actuating rod is arranged in a rotationally fixed manner. The coupling member can in this case be made flatter than the rest of the actuating rod. With such a connection, such a damping element can be arranged in the recess between the coupling member and the actuating rod.

Alternatively or additionally, the connection between the coupling member and the actuating rod can be realised such that the coupling section is connected to the coupling member by means of a sleeve, the sleeve surrounding the coupling section and the coupling member at least in some regions with a prestress, so that the coupling member and the coupling section of the actuating rod are pressed radially and/or axially against each other from the outside. In this case such a damping element is arranged between the sleeve and the actuating rod. It is also conceivable to arrange such a damping element between the sleeve and the coupling member. In these variants, the damping element, which is preferably produced from a plastic, is likewise prestressed in particular by the prestress of the sleeve, the prestress being selected such that the damping element has the desired damping property.

The sleeve can surround or enclose the coupling section and/or the coupling member over the entire circumference or over a section of the circumference. It is likewise conceivable for the sleeve to surround the coupling section and/or the coupling member in some sections in the circumferential direction.

The coupling section can have any desired shape and/or size, in particular length. The coupling section can for example be spherical at least in some regions or have a spherical section. The spherical configuration is in this case preferably arranged or realised on the side of the coupling section facing the coupling element.

The actuating arm can have an opening for connection to the actuating rod, in particular to the coupling member of the actuating rod. The opening of the actuating arm can be penetrated by a bolt, which connects the actuating arm to the actuating rod in a rotatable manner. In this case, such a damping element can be arranged in this connection region. Such a damping element preferably has an outer sleeve, which surrounds an inner sleeve, which for its part surrounds the bolt. A damping material is also arranged between the outer sleeve and the inner sleeve. In this case the inner sleeve is connected to one connection partner, while the outer sleeve is connected to the other connection partner. This means in particular that the inner sleeve can be connected to the actuating arm, while the outer sleeve is connected to the actuating rod, or vice versa. A plastic and/or a metallic material, for example metal fleece, is for example used as the damping material. In this variant, the damping element can therefore be configured in particular as a torsional damper.

The rotationally fixed connection between the actuating arm and the spindle can likewise be realised with the aid of such an opening in the actuating arm. In this case, the spindle can be arranged in a rotationally fixed manner in the opening of the actuating arm. Such a damping element can also be arranged at this connection point.

The at least one damping element preferably has a metal fleece and/or a plastic, in particular polytetrafluoroethylene. In particular, the damping material of the damping element can be produced from such a material and/or the damping element can consist of such a material. The damping element can also have a spring device.

In other embodiments, at least one such damping element is configured as a dynamic vibration absorber. This means therefore that the damping element is only connected to a vibrating constituent of the wastegate valve device, in particular the drive train, and has a counter vibration mass. The damping element configured as a dynamic vibration absorber can be shaped and/or connected to the constituent of the wastegate valve device in such a manner and/or be so heavy that it damps vibrations of the drive train by means of counter vibrations, which occur in a predefined resonance case.

The at least one damping element is preferably formed or configured in such a manner that it damps vibrations with orders of two or more compared to a basic vibration.

In further preferred embodiments, such a damping element is formed or configured in such a manner, in particular produced from such materials, that it ensures a thermal decoupling between the connection partners or inside the drive train in addition to damping the vibrations. Such a damping element therefore has in particular a low thermal conductivity, so that it also functions as a thermal decoupling.

The actuator device of the wastegate valve device can be configured or formed in any desired manner. However, the actuator device is preferably electrically operated. Pneumatically or hydraulically operated actuator devices are however also conceivable.

It is self-evident that the wastegate valve device according to the invention can have a plurality of such damping elements, which can be formed or configured identically or differently.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

BRIEF DESCRIPTION OF THE DRAWINGS

In the figures.

DETAILED DESCRIPTION

Figure 1:
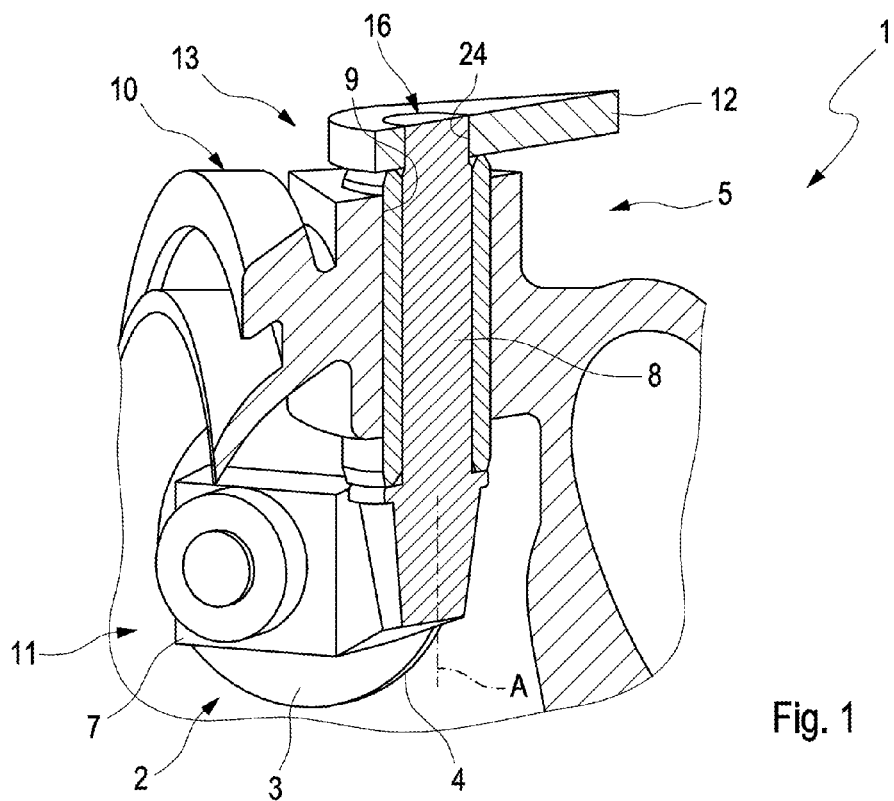
FIG. 1 schematically shows a section through a supercharging device having a wastegate valve device, FIG. 2 schematically shows an outer view of a wastegate valve device, FIGS. 3 to 9 schematically show different details of a drive train of a wastegate valve device.
Figure 2:
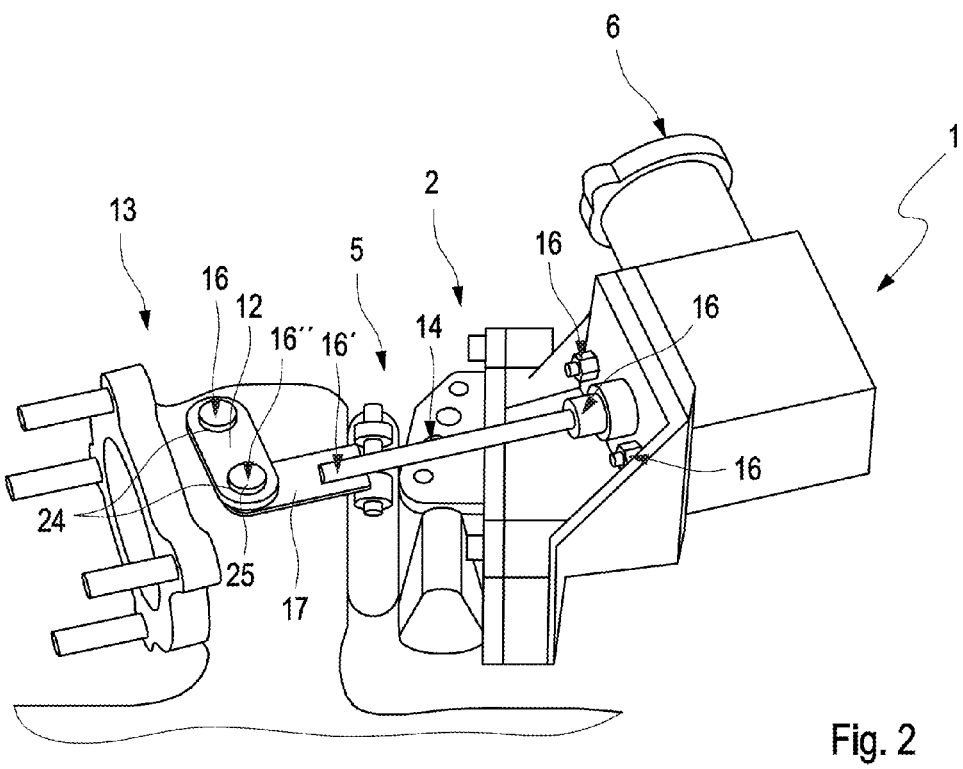

According to FIGS. 1 and 2, a supercharging device 1, which is formed in the example shown as an exhaust gas turbocharger 1, has a wastegate valve device 2, which comprises a valve disc 3, with which an opening 4 of a bypass can be opened, FIG. 1 showing a closed position of the valve disc 3 in which the opening 4 is closed. The valve disc 3 is connected to an actuator device 6 of the wastegate valve device 2 with the aid of a drive train 5 of the wastegate valve device 2. The drive train 5 comprises a spindle arm 7, which connects the valve disc 3 to a spindle 8 of the drive train 5, the spindle 8 and the spindle arm 7 being formed in one piece in the embodiment shown in FIG. 1. The spindle 8 is mounted in a housing opening 9 in the housing 10 of the exhaust gas turbocharger 1, so that the valve disc 3 and the spindle arm 7 are situated in an inner section 11 of the drive train 5, which is exposed to the exhaust gas driving the supercharging device 1, in particular when the valve disc 3 is in the open position, and is correspondingly situated in a fluid path of the exhaust gas.

On the outside of the housing 10, that is, on the side facing away from the valve disc 3, the spindle 8 is connected in a rotationally fixed manner to an actuating arm 12 of the drive train 5, the actuating arm 12 accordingly being arranged in an outer section 13 of the drive train 5. The actuating arm 12 is moreover connected in a rotatable manner to an actuating rod 14 of the drive train 5, which is connected to the actuator device 6 and interacts with the same. Activation of the actuator device 6 results in a displacement of the drive train 5 and by means of this inpivoting of the valve disc 3 about the spindle axis A.

According to the invention, at least one damping element 15 is provided between the valve disc 4 and the actuator device 6. Some such damping elements 15 are described below. The at least one damping element 15 can in particular be realised in a connection region 16 between the individual constituents of the drive train 5 or in connection regions 16 between the drive train 5 and the actuator device 6.

Figure 3:
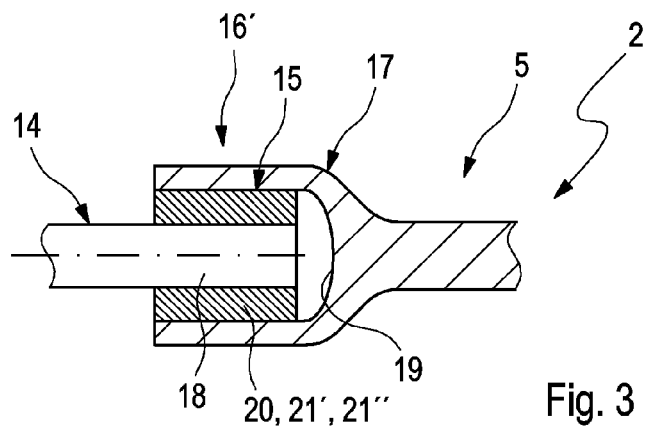

As can be seen in particular in FIG. 2, the actuating rod 14 can for example have a coupling member 17, which is connected to the actuating arm 12 in a rotatable manner. In this connection region 16', a coupling section 18 of the actuating rod 14 is connected to the coupling member 17, as can be seen in FIG. 3. In this case the coupling member 17 has a recess 19, in which the coupling section 18 of the actuating rod 14 is arranged. Inside the recess 19, such a damping element 15 is arranged, which at least partially encloses the coupling section 18 and is prestressed between the coupling section 18 and the coupling member 17. This damping element 15 is for example a damping material 20, which can consist for example of metal fleece 21' or of plastic 21", so that vibrations inside the drive train 5 are damped.

Figure 4:
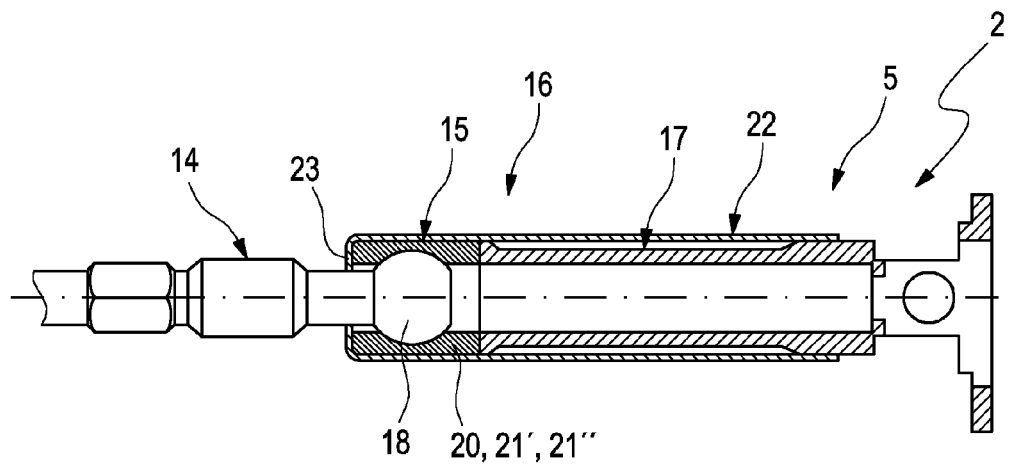

A further example of an actuating rod 14 is shown in FIG. 4. In this case the damping element 15 has a sleeve 22 and a damping material 20. The sleeve 22 encloses the coupling section 18, which is spherical in some regions, and the coupling member 17 at least partially. In this case, the damping material 20 is arranged radially between the coupling section 18 and the sleeve 22. Furthermore, the sleeve 22, which is preferably produced from metallic materials, is formed and mounted in such a manner that it presses and thus prestresses the damping material 20 against the coupling section 18, while it is prestressed against the coupling member 17 at the same time. In addition, an axial prestress of the sleeve 22 in relation to the coupling member 17 effects a radial prestress of the sleeve 22 and thus of the damping material 20 in relation to the coupling section 18. The sleeve 22 also has on the side facing away from the coupling member 17 an inwardly directed edge 23, which makes contact with the actuating rod 14 on the side of the coupling section 18 facing away from the coupling member 17. Accordingly, the sleeve 22 grasps the coupling section 18, whereby the coupling section 18 is prevented from kinking away from the coupling member 17. Kinking of the coupling section 18 can be achieved by the prestress of the damping material 20. Alternatively or additionally, kinking can also be prevented by selecting the static friction and/or the geometric shape, e.g. an oval shape, of the coupling section 18 and of the damping material 20 accordingly.

Figure 5:
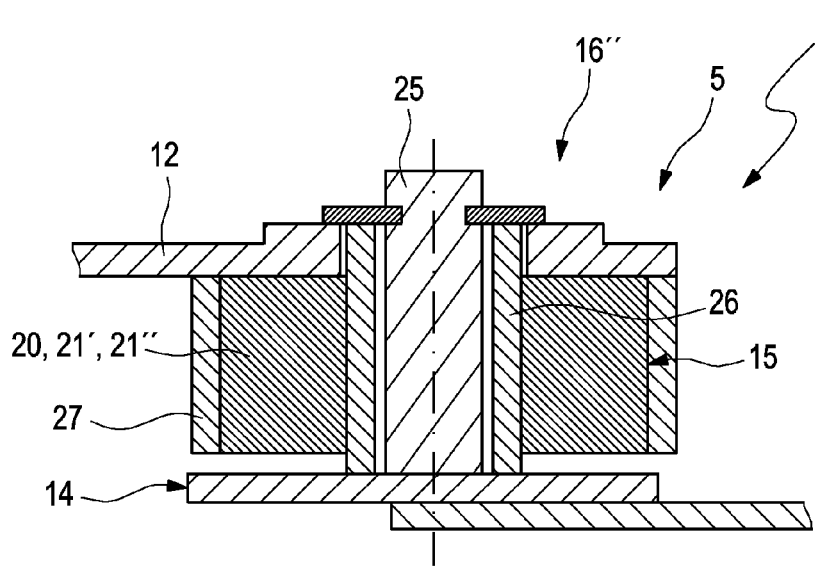

As shown in FIGS. 1 and 2, the actuating arm 12 has two openings 24. The spindle 8 is arranged in a rotationally fixed manner in one of these openings 24. A bolt 25 is arranged in the other opening 24 in the connection region 16", said bolt being connected on the other side to the actuating rod 14, as a result of which a rotatable connection is realised between the actuating rod 14 and the actuating arm 12. FIG. 5 shows an enlarged detail of the connection region 16". As can be seen, the damping element 15 has an inner bushing 26, which surrounds the bolt 25 and is surrounded by an outer bushing 27 of the damping element 15. Damping material 20 is arranged between the inner bushing 26 and the outer bushing 27. The inner bushing 26 is also connected to one connection partner, while the outer bushing 27 is connected to the other connection partner. In the example shown, the inner bushing 26 is also connected to the actuating rod 14, while the outer bushing 27 is connected to the actuating arm 12. The damping element 15 thus acts as a type of torsional damper.

As already mentioned, metal fleece 21' or else plastic 21" are for example used as damping materials 20, polytetrafluoroethylene and/or elastomers preferably being used as the plastic 21".

Figure 6:
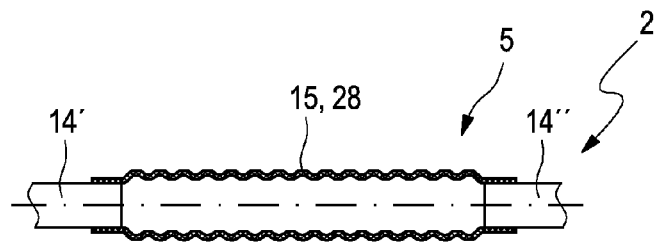

At least one such damping element 15 can also be arranged inside the actuating rod 14. FIG. 6 shows for example such a damping element 15, which is formed as a spring device 28 and connects two separate actuating rod parts 14', 14" to each other.

Figure 7:
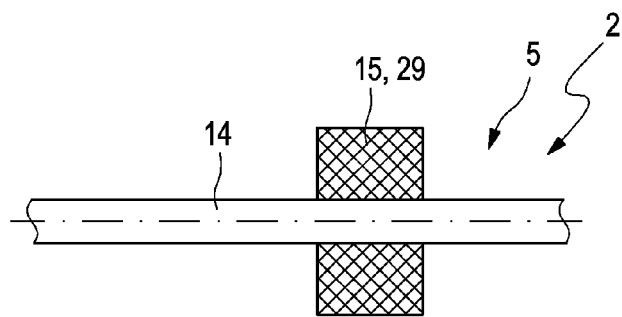

FIG. 7 shows a damping element 15, which is configured as a dynamic vibration absorber 29, surrounds the actuating rod 14 and is connected to the same. The dynamic vibration absorber 29 is in this case configured as a mass, which creates an imbalance that damps the vibrations of the drive train 4 by absorption.

Figure 8:
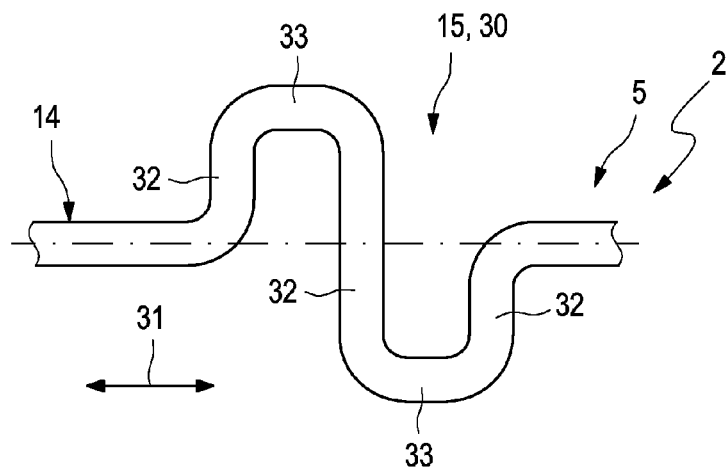
Figure 9:
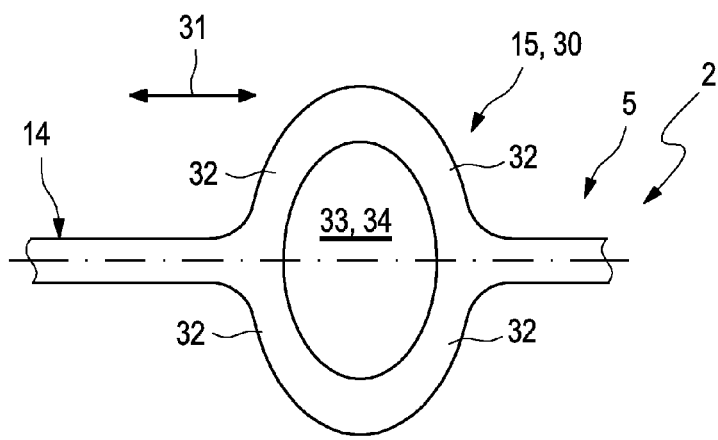

The at least one damping element 15 can also be configured as an integral constituent of the drive train 5. FIGS. 8 and 9 show examples of such damping elements 15, these being realised as shaped portions 30 of the actuating rod 14. These damping elements 15 formed integrally in the actuating rod 14 have sections 32 running transversely to a longitudinal extent 31 of the actuating rod 14. In addition, both damping elements 15 are formed perpendicularly and symmetrically to the longitudinal centre axis of the actuating rod 14.

In the example shown in FIG. 8, the sections 32 run substantially perpendicularly to the longitudinal extent 31 of the actuating rod 14 and are connected to each other by means of other connection sections 33 that run parallel to the longitudinal extent 31, so that the damping element 30 is configured as a bend in the actuating rod 14.

The damping element 15 shown in FIG. 9 is oval, the sections 32 that run transversely to the longitudinal extent 31 enclosing a likewise oval damping element opening 33. The section shown in FIG. 9 can likewise be a cross section, so the sections 32 running transversely to the longitudinal extent 31 are arranged in an egg-shaped manner and surround an air pocket 34.

The invention claimed is:

1. A wastegate valve device for a supercharging device, comprising:
   a valve disc, which is connected to an actuator via a drive train;
   at least one damper arranged between the valve disc and the actuator;
   wherein the drive train has an inner section, which is arranged inside a fluid path of a driving fluid, the inner section including a spindle arm, which is connected to a spindle and to the valve disc;
   wherein the spindle is connected to an operating arm, which is arranged in an outer section of the drive train, the operating arm arranged outside the fluid path, and is connected to an operating rod, which is connected to the actuator;
   wherein the damper is arranged in a connection region of the drive train, the operating rod having a coupling member, which is connected to the operating arm, the damper including a sleeve, which surrounds a coupling section of the operating rod and the coupling member, the damper being prestressed against the coupling section via the sleeve in a radial direction and simultaneously against the coupling member; and
   wherein at least one damping material of the damper is arranged between at least one of the sleeve and the coupling section and the sleeve and the coupling member.

2. The wastegate valve device according to claim 1, wherein the damper is at least partially made of at least one of metal fleece and plastic.

3. The wastegate valve device according to claim 2, wherein the damper is thermally decoupled inside the drive train.

4. The wastegate valve device according to claim 3, wherein the actuator is electrically operated.

5. The wastegate valve device according to claim 2, wherein the sleeve surrounds at least one of the coupling section and the coupling member over the entire circumference of the at least one of the coupling section and the coupling member.

6. The wastegate valve device according to claim 5, wherein the coupling section is spherical in at least one region.

7. The wastegate valve device according to claim 1, wherein the damper decouples thermally in the connection region.

8. The wastegate valve device according to claim 1, wherein the actuator is electrically operated.

9. The wastegate valve device according to claim 8, wherein the sleeve surrounds at least one of the coupling section and the coupling member over the entire circumference of the at least one of the coupling section and the coupling member.

10. The wastegate valve device according to claim 1, wherein at least a portion of the coupling section is spherical.

11. The wastegate valve device according to claim 1, wherein the sleeve surrounds at least one of the coupling section and the coupling member over the entire circumference of the at least one of the coupling section and the coupling member.

12. The wastegate valve device according to claim 1, wherein the damper is made of at least one of polytetrafluoroethylene and an elastomer.

13. The wastegate valve device according to claim 1, wherein the actuator is one of pneumatically and hydraulically operated.

14. The wastegate valve device according to claim 1, wherein the coupling member includes a recess in which the coupling section of the actuating rod is arranged, wherein the damper is arranged in the recess.

15. The wastegate valve device according to claim 1, further comprising at least one damper surrounding the operating rod.

16. An exhaust gas turbocharger, comprising:
a wastegate valve device connected to an actuator via a drive train;
at least one damper arranged between the valve disc and the actuator in a connection region of the drive train, the drive train having an inner section arranged inside a fluid path of a driving fluid, the inner section including a spindle arm connected to a spindle and the valve disc;
the spindle connected to an operating arm arranged in an outer section of the drive train disposed outside the fluid path and connected to an operating rod, the operating rod connected to the actuator, wherein the operating rod has a coupling member connected to the operating arm;
wherein the damper includes a sleeve surrounding a coupling section of the operating rod and the coupling member, the coupling section having at least one spherical region, wherein the damper is prestressed against the coupling section via the sleeve in a radial direction and simultaneously against the coupling member, the sleeve surrounding at least one of the coupling section and the coupling member over the entire circumference of the at least one of the coupling section and the coupling member; and
wherein the damper includes at least one damping material arranged between at least one of (i) the sleeve and the coupling section and (ii) the sleeve and the coupling member.

17. The exhaust gas turbocharger according to claim 16, wherein the damper is thermally decoupled inside the drive train.

18. The exhaust gas turbocharger according to claim 16, wherein the actuator is electrically operated.

19. The exhaust gas turbocharger according to claim 16, wherein the at least one damping material is made of at least one of a plastic and a metal.

20. The exhaust gas turbocharger according to claim 16, wherein the at least one damping material is arranged between the sleeve and the coupling section around at least a portion of the at least one spherical region.

* * * * *